US012648515B2

(12) United States Patent
Regier et al.

(10) Patent No.: US 12,648,515 B2
(45) Date of Patent: Jun. 9, 2026

(54) CENTER OF HEADER SICKLE DRIVE

(71) Applicant: AGCO Corporation, Duluth, GA (US)

(72) Inventors: Bernard Dean Regier, Hesston, KS (US); David Wayne O'Reilly, McPherson, KS (US); Jeffrey S. Funk, Hesston, KS (US); Benjamin Adam Welle, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 488 days.

(21) Appl. No.: 18/311,942

(22) Filed: May 4, 2023

(65) Prior Publication Data

US 2024/0032465 A1     Feb. 1, 2024

Related U.S. Application Data

(60) Provisional application No. 63/369,821, filed on Jul. 29, 2022.

(51) Int. Cl.
| | |
|---|---|
| *A01D 34/14* | (2006.01) |
| *A01D 34/30* | (2006.01) |
| *A01D 69/06* | (2006.01) |
| *A01D 34/04* | (2006.01) |
| *A01D 34/38* | (2006.01) |

(52) U.S. Cl.
CPC .......... *A01D 34/145* (2013.01); *A01D 34/30* (2013.01); *A01D 69/06* (2013.01); *A01D 34/04* (2013.01); *A01D 34/38* (2013.01)

(58) Field of Classification Search
CPC ...... A01D 34/145; A01D 34/30; A01D 69/06; A01D 34/04; A01D 34/38
See application file for complete search history.

(56) References Cited

U.S. PATENT DOCUMENTS

| | | | |
|---|---|---|---|
| 4,360,999 A | * | 11/1982 | Seyerle .............. A01D 34/6812 |
| | | | 475/900 |
| 10,827,673 B2 | | 11/2020 | Cook |
| 11,160,209 B2 | | 11/2021 | Zumbach |
| 2017/0105344 A1 | | 4/2017 | Webermann et al. |
| 2018/0093564 A1 | * | 4/2018 | Long ..................... B60K 6/405 |

(Continued)

OTHER PUBLICATIONS

UK Intellectual Property Office, Search report for related UK Application No. GB2211727.9, dated Jan. 19, 2023, 4 pages.

*Primary Examiner* — Nicole Coy
*Assistant Examiner* — Jennifer A Railey

(57) ABSTRACT

A sickle header has right and left cutter bar assemblies each having a knife assembly configured to move in a reciprocating motion. A first transfer plate connects the knife assembly of the right cutter bar assembly and a second transfer plate connects the knife assembly of the left cutter bar assembly. A center sickle drive assembly includes first and second epicyclic drives connected to the right cutter bar assembly translate rotational movement of a drive motor gear into linear oscillating motion of output cranks that are connected to the first transfer plate. Third and fourth epicyclic drives connected to the left cutter bar assembly translate rotational movement of the drive motor gear into linear oscillating motion of output cranks that are connected to the second transfer plate, such that the cranks of the epicyclic drives simultaneously drive the knife assembly of the respective cutter bar assembly in a reciprocating motion.

7 Claims, 6 Drawing Sheets

(56)     References Cited

U.S. PATENT DOCUMENTS

2019/0090418 A1     3/2019  Cook
2019/0124841 A1*    5/2019  Burch  ................... A01D 45/10
2020/0187413 A1*    6/2020  Parson  .................. A01D 34/30

* cited by examiner

CENTER OF HEADER SICKLE DRIVE

RELATED APPLICATIONS

This application claims the priority benefit of U.S. Provisional Application No. 63/369,821 filed Jul. 29, 2022, said Provisional Application in its entirety being hereby incorporated by reference into the present specification.

BACKGROUND OF THE INVENTION

Field of Invention

This invention relates generally to a header for a plant cutting machine such as a combine or a windrower, and more particularly, to a header including a plurality of compact epicyclic drive mechanisms disposed at locations along the width thereof and connected in driving relation to knife assemblies of a sickle of the header.

Description of Related Art

Agricultural combines have increased in capacity to harvest large quantities of crop material to such a degree that it is becoming desirable to have the capability to increase the ground speed of the combine to match header productivity with the increased combine capacity. Generally, the maximum ground speed of a header is considered to be the greatest speed at which the cutting sickle of the header will not strip and leave crop on the field. This, in turn, is a function of the speed of the reciprocating movement of the knife assembly or assemblies of the sickle header, which is typically expressed in terms of strokes per minute of the knife assemblies. Generally in this regard, the more strokes per minute of the knife assembly of a sickle header, the greater its crop cutting capacity, and thus the greater ground speed achievable using that sickle header. However, the maximum achievable strokes per minute of a sickle has been found to be a function of the mass of the knife assembly being moved in the reciprocating manner.

Presently, the knife assemblies of the large headers of harvesting machines are typically driven from the side or end of the header by an oscillating drive, which can include, but is not limited to, an eccentric shaft on a rotating hub, a wobble drive, or a similar well known commercially available device. This location is advantageous, as it does not obstruct or interfere with flow of cut crop material into the header. However, it also a disadvantage for wider headers, as it requires the knife assemblies to have a length of at least one half the width of the header, and thus a greater mass, which in turn, requires a lower operating speed.

The idea of a sickle drive in the center of a header is not a new idea. One advantage of these center drives is that the end dividers of the header can be very narrow so as to minimize the damage to uncut crop. The structure of the header does not need to support heavy sickle drives mounted on the ends of the headers. It would be desired to have a sickle drive in the center of the header that minimizes the number of pivoting and reversing components so as to make the header more robust.

BRIEF SUMMARY

In one aspect, the invention is directed to a sickle header having an elongate cutter bar along a forward edge of the sickle header that extends in a transverse direction along a width of sickle header operable for severing crop. The sickle header has a stationary bar on the forward portion of and extending along the width of the cutter bar with an array of guards projecting forwardly at sidewardly spaced intervals. The sickle header includes a right cutter bar assembly and a left cutter bar assembly, each cutter bar assembly having an elongate knife assembly formed of a plurality of knife sections configured to move in a reciprocating motion to effect a cutting action that severs plant stems captured between the plurality of knife sections and the guards. The sickle header also includes a first transfer plate connected to the knife assembly of the right cutter bar assembly and a second transfer plate connected to the knife assembly of the left cutter bar assembly. The sickle header also includes a center sickle drive assembly connected in driving relation to the first and second transfer plates and having a drive motor gear. The center sickle drive assembly includes a first epicyclic drive and a second epicyclic drive connected to the right cutter bar assembly, wherein each of the first and second epicyclic drives is configured to translate rotational movement of the drive motor gear into linear oscillating motion of an output crank that is connected to the first transfer plate, such that the cranks of the first and second epicyclic drives simultaneously drive the knife assembly of the right cutter bar assembly in a reciprocating motion. The center sickle drive assembly includes a third epicyclic drive and a fourth epicyclic drive connected to the left cutter bar assembly, wherein each of the third and fourth epicyclic drives is configured to translate rotational movement of the drive motor gear into linear oscillating motion of an output crank that is connected to the second transfer plate, such that the cranks of the third and fourth epicyclic drives simultaneously drive the knife assembly of the left cutter bar assembly in a reciprocating motion.

These and other features and advantages of this invention are described in, or are apparent from, the following detailed description of various exemplary embodiments of the systems and methods according to this invention.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
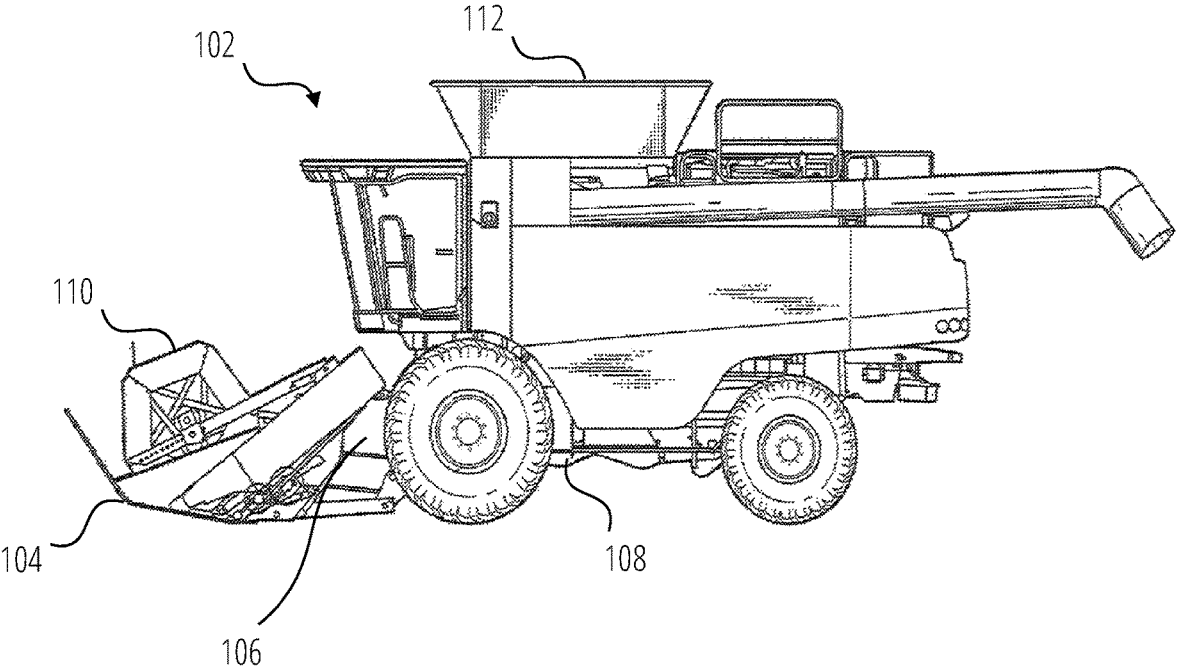
FIG. 1 is a schematic diagram that illustrates a side perspective view of an agricultural machine in which an embodiment of an example sickle header may be implemented.

Certain embodiments of a sickle header and associated systems are disclosed that enable both the harvesting of grain by an agricultural machine (hereinafter, a combine harvester used as an illustrative example) to which the sickle header is coupled. In one embodiment, the sickle header is configured as a grain header, and comprises a frame that houses a cutter bar comprising a plurality of knives (e.g., oscillating knives). The plane of operation of the cutter bar may be independently adjusted based on the type and/or height of the crops in a field.

Having summarized certain features of a sickle header of the present disclosure, reference will now be made in detail to the description of the disclosure as illustrated in the drawings. While the disclosure will be described in connection with these drawings, there is no intent to limit it to the embodiment or embodiments disclosed herein. For instance, though emphasis is placed on a combine harvester with a front-coupled header, some embodiments may use other configurations of a combine harvester (e.g., not self-propelled) or other agricultural machine (e.g., a windrower). Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Turning now to FIG. 1, an example agricultural machine 102 on which an embodiment of an example header 104 may be implemented is illustrated. The agricultural machine 102 may be a combine harvester, and is shown equipped with a header 104 configured as a sickle header. One having ordinary skill in the art should appreciate in the context of the present disclosure that the example combine harvester 102 is merely illustrative, and that other machines that utilize the sickle header 104 may be used. Further, though illustrated as a draper-style sickle header 104, other header designs may be used that incorporate the relevant features of the sickle header 104. The example combine harvester 102 is shown in FIG. 1 harvesting crops in a field as it traverses the field. The sickle header 104 couples directly or indirectly (e.g., via a lateral tilt frame) to a feeder house 106 of the combine harvester 102 in conventional manner. The feeder house 106 may be raised by one or more hydraulic cylinders (not shown) coupled between the feeder house 106 and a chassis 108 of the combine harvester 102, which in turn enables the raising and lowering of the sickle header 104. One or more additional hydraulic cylinders may also be used to enable tilting (e.g., rolling, etc.) of the sickle header 104. In one embodiment, the sickle header 104 comprises adjustable reels 110 that are respectively coupled to a plurality of tine or fork bars (not shown) that rotate to cause crop to be forced against a cutter bar (obscured from view in FIG. 1) as is known.

In general, and using the harvesting of tall crops as an illustrative example, the sickle header 104 of the combine harvester 102 cuts a first portion (e.g., primarily the heads of the plants of the crops, and a small portion beneath the heads comprising material other than grain (MOG)) of each plant of the crops, and the cut first portion is delivered (e.g., via the draper conveyors or one or more augers) to a centralized, rear opening of the sickle header 104 leading to the front end of the feeder house 106. In the feeder house 106, the cut, first portion of crop materials are moved upwardly and rearwardly within until reaching a processor comprising a thresher rotor (obscured from view in FIG. 1). In one embodiment, the thresher rotor may comprise an axial-based, single or twin rotor design such as that found in an IDEAL Combine by AGCO Corp. However, other combine designs may be used, such as a single, transverse rotor, such as that found in a Gleaner Super Series Combine by AGCO Corp. The thresher rotor processes the crop materials in known manner and passes any non-grain portion of the crop material (e.g., heavier chaff, corn stalks, etc.) toward the rear of the combine harvester 102 and any remaining portion (e.g., grain and possibly light chaff) through a cleaning process in known manner. In general, the sickle header 104 minimizes the amount of MOG (especially straw) that enters the threshing unit. In the processor, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. The cleaned grain that drops to the bottom of the cleaning system is delivered by a conveying mechanism that transports the grain to a well-known elevator mechanism (not shown), which conveys the grain to a grain bin 112 located at the top of the combine harvester 102. Any remaining chaff and partially or unthreshed grain is recirculated through the processor via a tailings return conveying mechanism.

Figure 2:
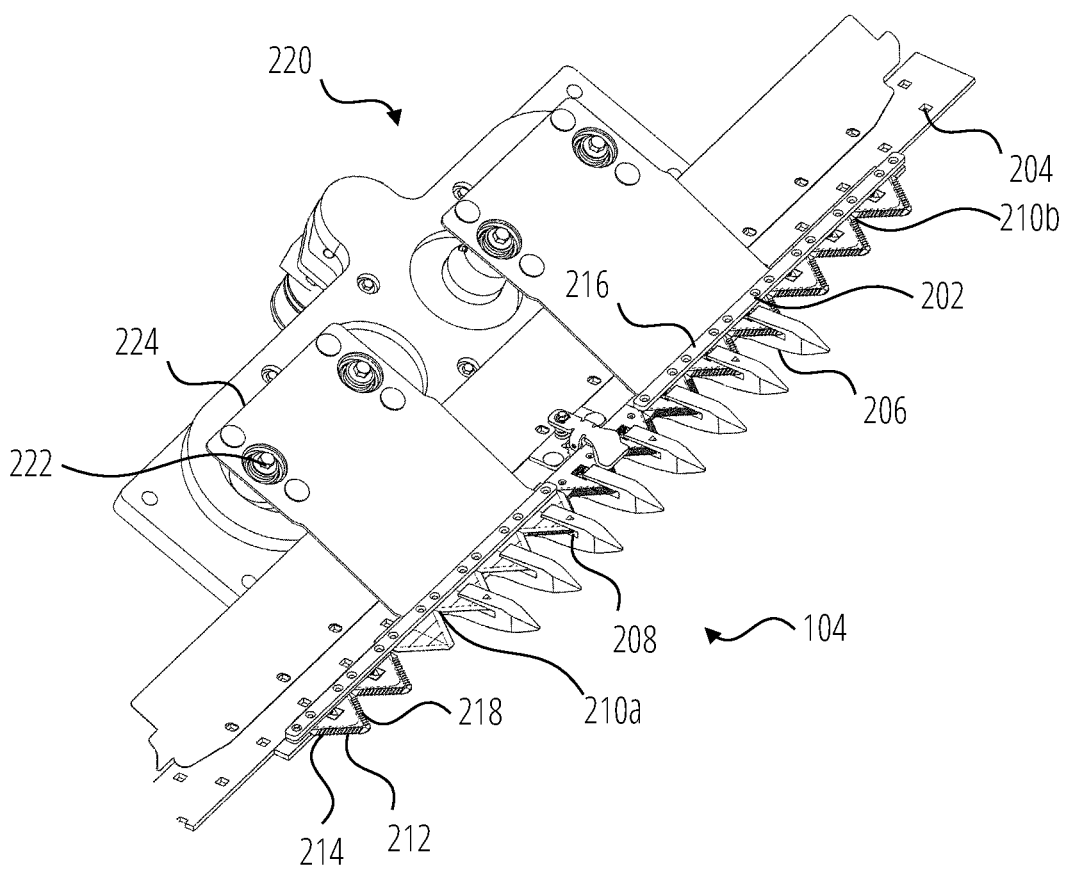
FIG. 2 illustrates is a top perspective view of a portion of the sickle header in accordance with one embodiment.

Referring now to FIG. 2, the sickle header 104 includes an elongate cutter bar 202 along a forward edge of the sickle header 104 that extends in a transverse direction along the width of sickle header 104. As is known in the art, the cutter bar 202 is operable for severing the crop for induction into combine harvester 102. A stationary bar 204 is located on the forward portion of and extends the width of the cutter bar 202. An array of guards 206 is mounted to the stationary bar 204 with suitable fasteners such that the guards 206 project forwardly at sidewardly spaced intervals. The guards 206 have sidewardly facing aligned slots 208.

The illustrated embodiment of the cutter bar 202 has right and left cutter bar assemblies 210a and 210b. Each cutter bar assembly 210a and 210b has an elongate knife assembly 212 for reciprocating longitudinally within the slots 208 of the guards 206, the knife assemblies 212 of the right and left cutter bar assemblies 210a and 210b being essentially of identical construction. Each knife assembly 212 includes a row of knife sections 214 mounted on a knife bar 216 that is moveable in a linearly oscillating motion. Each knife section 214 includes oppositely facing, angularly related knife edges 218 which, in conjunction with adjacent guards 206, effects a shearing or cutting action which severs plant stems and stalks captured between the knife edges 218 and the guards 206 as the knife assemblies 212 are reciprocatingly moved sidewardly.

A center sickle drive assembly 220 is connected in driving relation to the right and left cutter bar assemblies 210a and 210b. The center sickle drive assembly 220 is illustrated in FIG. 2 at a central location on the sickle header 104 near where the right and left cutter bar assemblies 210a and 210b meet. The center sickle drive assembly 220 includes a pair of cranks 222 that interact with a transfer plate 224 connected to the knife bar 216 of the knife assembly 212 of the right cutter bar assembly 210a such that the cranks 222 are simultaneously operable for reciprocatingly driving the knife assembly 212 sidewardly. Similarly, the center sickle drive assembly includes a pair of cranks 222 that interact with a transfer plate 224 connected to the knife assembly 212 of the left cutter bar assembly 210*b* such that the cranks 222 of the center sickle drive assembly 220 are simultaneously operable for reciprocatingly driving the knife assemblies 212 in timed relation so as to move the knife assemblies 212 in opposite sideward directions. That is, as the knife assembly 212 of the left cutter bar assembly 210*b* is moved in one sideward direction, the knife assembly 212 of the right cutter bar assembly 210*a* will be moved in the opposite sideward direction. The length of the sideward movements, or strokes, will be sufficient for providing the desired cutting action, which will typically be at least equal to about the sideward extent of a knife edge 218 of a typical knife section 214. Each transfer plate 224 is preferably constructed of a sheet or cast metal bent or formed to a sectional shape about as shown, and are connected to the knife bar 216 of the knife assemblies 212 of the respective cutter bar assembly 210*a* or 210*b* in a suitable manner. It is desired for the knife assemblies 212 move only in the sideward directions relative to stationary bar 204, and not forwardly, rearwardly, upwardly or downwardly to any significant extent relative thereto.

Figure 3:
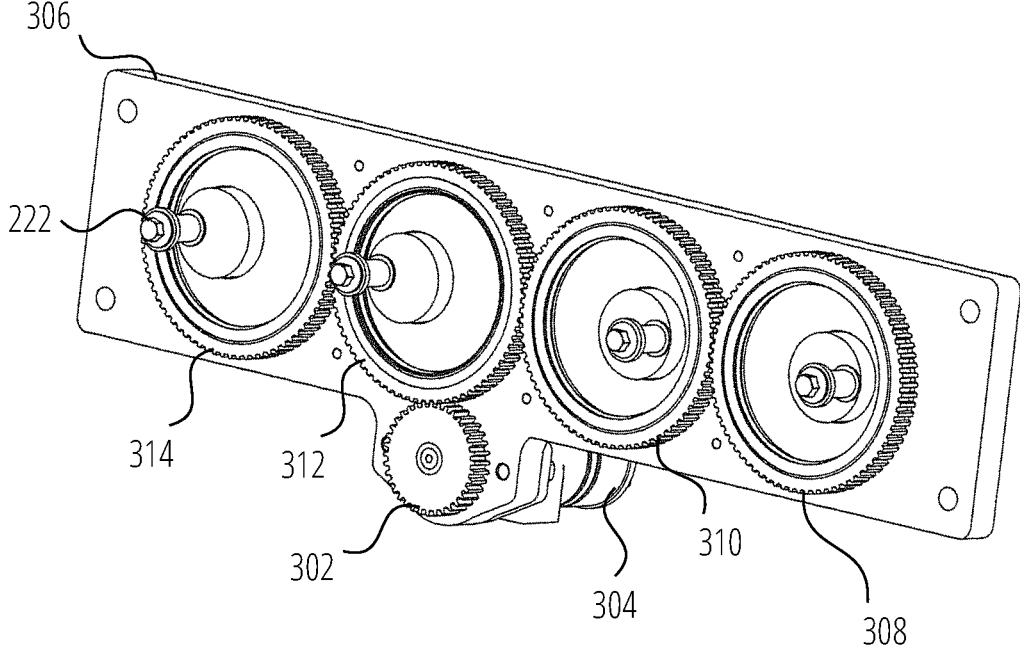
FIG. 3 illustrates a center sickle drive assembly of the sickle header of FIG. 2.
Figure 4:
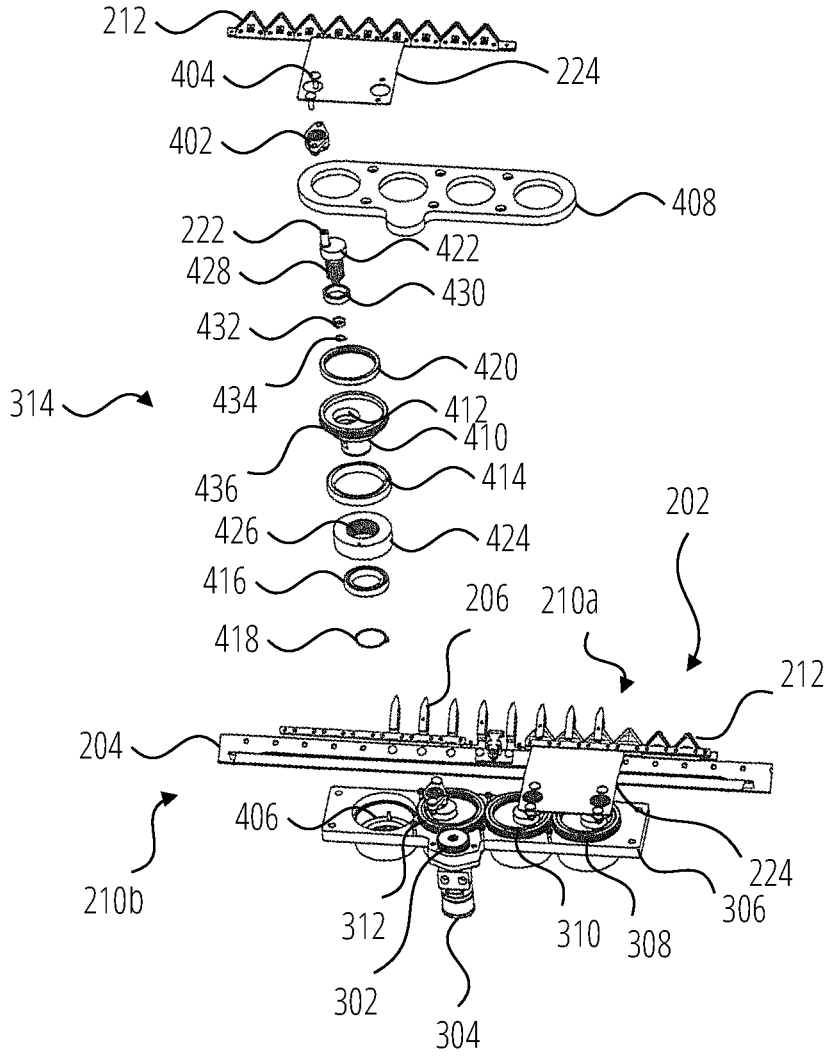
FIG. 4 illustrates a partially exploded perspective view of the center drive assembly of FIG. 2.
Figure 5:
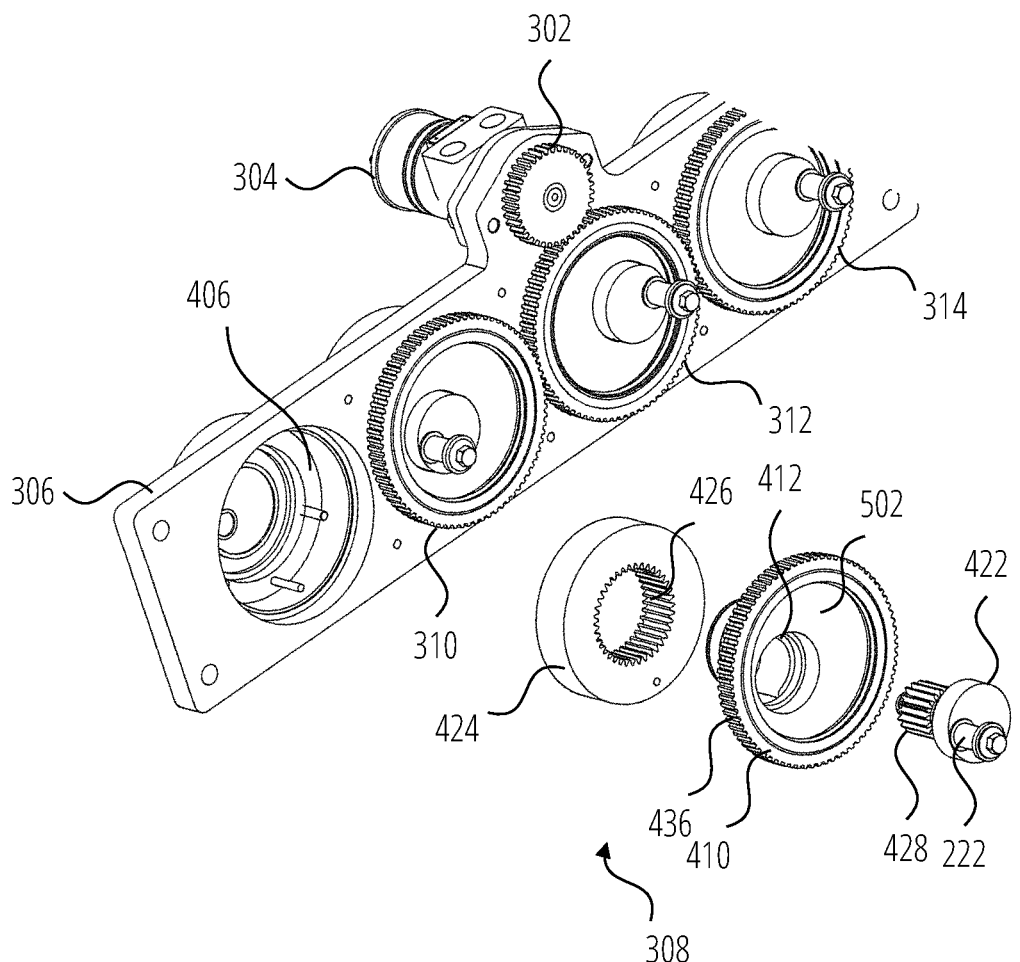
FIG. 5 illustrates a partially exploded perspective view of the center drive assembly of FIG. 2.

Turning now to FIGS. 3, 4 and 5, the center sickle drive assembly 220 includes a drive motor gear 302 driven by a power source, such as drive motor 304. The drive motor 304 can be, but is not limited to, a hydraulic drive motor. The drive motor 304 is illustrated as being mounted to a rear end of a main block 306 and is connected to a source of pressurized fluid and a fluid reservoir (not shown) on the combine harvester 102 in any suitable conventional, well-known manner. The drive motor 304 is connected in rotatably driving relation to the drive motor gear 302, which is supported by a suitable bearing (not shown) mounted within the main block 306. The drive motor 304 may be driven by an alternative power source, which can include, but is not limited to, a PTO shaft, or an electric motor, or other common driver such as a belt or chain (not shown) or a combination of such drives, and can be connected in rotatably driving relation to the drive motor gear 302 via a drive shaft or other suitable manner of connection.

The drive motor gear 302 provides a driving input to the right cutter bar assembly 210*a* and to the left cutter bar assembly 210*b* as will be explained. In one embodiment, the right cutter bar assembly 210*a* includes a first epicyclic drive 308 and a second epicyclic drive 310, which are configured to translate rotation of the drive motor gear 302 into the sideward reciprocating movement of the cranks 222 that are connected to the knife assembly 212 of the right cutter bar assembly 210*a*. The left cutter bar assembly 210*b* includes a third epicyclic drive 312 and a fourth epicyclic drive 314, which are configured to translate the rotation of the drive motor gear 302 into sideward reciprocating movements of the cranks 222 that are connected to the knife assembly 212 of the left cutter bar assembly 210*b*. Here, it should be noted that the drive capability of the right cutter bar assembly 210*a* and the left cutter bar assembly 210*b* could also be provided by a plurality of drive motors 304 and drive motor gears 302, which could be driven separately.

Figures 6A, 6B:
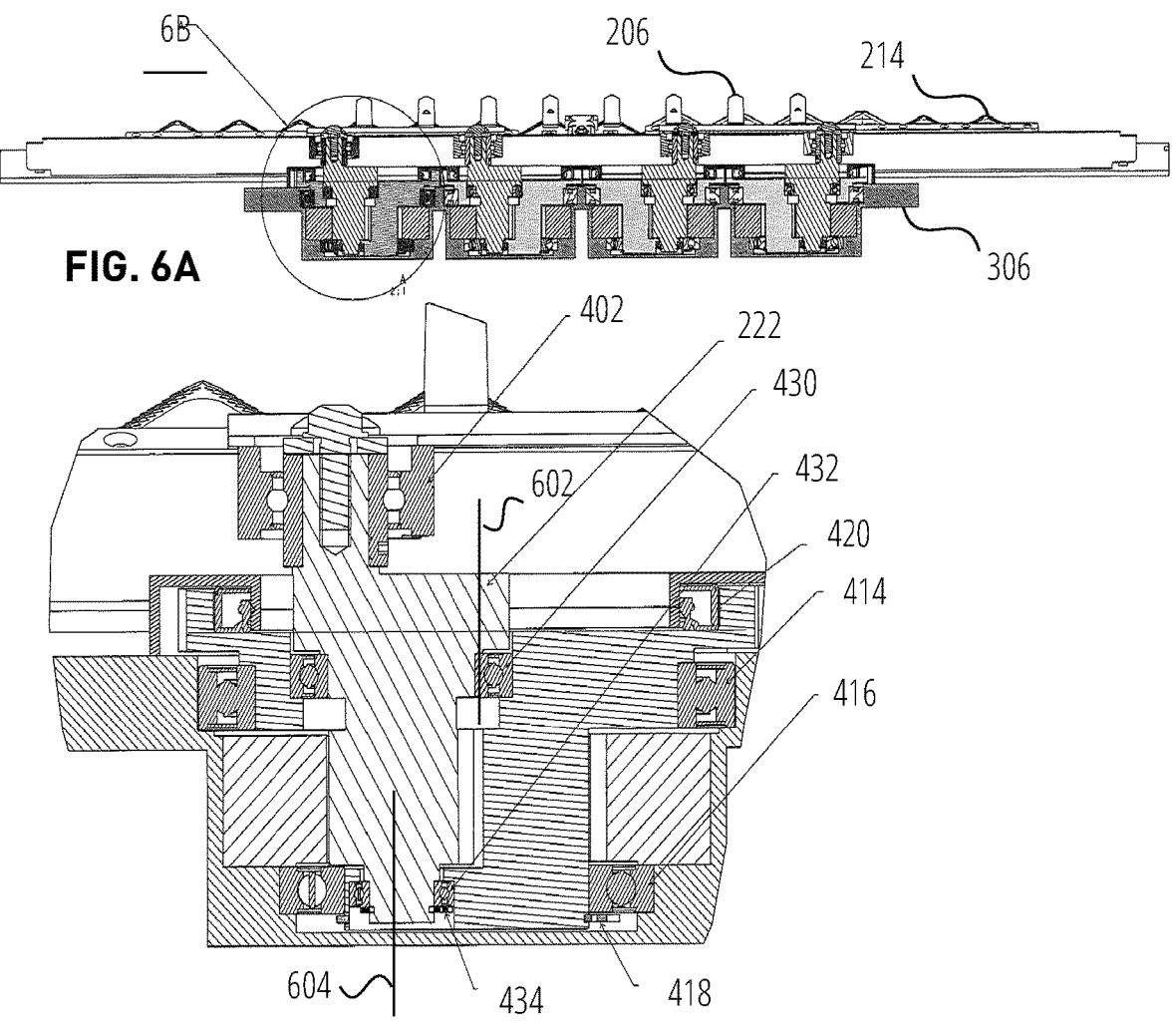
FIG. 6A illustrates sectional view of the center drive assembly of FIG. 2.
FIG. 6B illustrates an enlarged sectional view of a portion of the center drive assembly of FIG. 6A.

The epicyclic drives 308, 310, 312 and 314 are substantially similar, so they will be briefly described herein in conjunction with the exploded view of the fourth epicyclic drive 314 shown in FIG. 4. The crank 222 of the fourth epicyclic drive 314 is connected to the transfer plate 224 with a sickle bearing 402. The sickle bearing 402 mounts on the transfer plate 224 with suitable plate fasteners 404. The fourth epicyclic drive 314 is received in a well 406 incorporated within the main block 306 and enclosed within the well 406 with a block cover 408 to aid in the prevention of entry of contaminants into the interior thereof. The fourth epicyclic drive 314 includes a driver 410 having a first vertical or substantially vertical driver rotational axis 602 best seen on FIG. 6B. The driver 410 includes an eccentric opening 412 in an inner hub 502 (FIG. 5) therein at a location offset from the rotational axis of the driver 410. The well 406 includes an upper inner circumferential bearing seat into which an upper driver bearing 414 is suitably mounted and retained and a lower inner circumferential bearing seat into which a lower driver bearing 416 is suitably mounted and retained, such that the driver 410 is rotationally received in the well 406 and retained therein, for instance, using a driver snap ring 418 and a driver seal 420. An eccentric element 422 is received in the eccentric opening 412. The eccentric element has an eccentric axis 604 (best seen in FIG. 6B), parallel to, but offset from the driver rotational axis 602. The crank 222 is mounted on and carried by the eccentric element 422.

Situated between the driver 410 and the eccentric element 422 is a stationary central member 424 having internal gear teeth 426. Extending downward from the eccentric element 422 is a crank gear 428 having external gear teeth adapted to matingly engage the internal gear teeth 426 of the central member 424. The eccentric element 422 rotates in an upper crank bearing 430 which reside in the eccentric opening 412 in the driver 410 and a lower crank bearing 432 which resides in a lower portion of the driver 410 and is held in place with a crank snap ring 434. Rotation of the drive motor gear 302 results in rotational motion of the driver 410, which through the central member 424 and eccentric element 422, is transferred into linear oscillating motion of the crank 222 in a direction transverse to the eccentric axis 604. The oscillating motion of the crank 222 is in line with a longitudinal axis of the cutter bar 202. As epicyclic drives are well known in the art, further description of the operation of each epicyclic drive need not be included herein.

In the illustrated embodiment, the drive motor gear 302 meshes with the external gear 436 of the driver 410 of the third epicyclic drive 312 to cause the driver 410 to rotate in a first direction about its driver rotational axis 602. The external gear 436 of the third epicyclic drive 312 meshes with the external gear 436 of the fourth epicyclic drive 314 causing rotation thereof as well in a direction opposite the first direction about its driver vertical driver rotational axis 602. While the third and fourth epicyclic drives 312, 314 desirably share a substantially common construction, the eccentric openings 412 are configured such that, although rotated in the opposite direction, their cranks 222 will be simultaneously driven in the same linear oscillating motion to drive the knife assembly 212 of the left cutter bar assembly 210*b*.

In the illustrated embodiment, the external gear 436 of the third epicyclic drive 312 also meshes with the external gear 436 of the second epicyclic drive 310 causing rotation thereof as well in a direction opposite the first direction about its driver vertical driver rotational axis 602. The external gear 436 of the second epicyclic drive 310 meshes with the external gear 436 of the first epicyclic drive 308 causing rotation thereof as well in the first direction about its driver rotational axis 602. While the first and second epicyclic drives 308, 310 desirably share a common construction, they are timed differently such that, although rotated in the opposite direction, their cranks 222 will be simultaneously driven in the same linear oscillating motion to drive the knife assembly 212 of the right cutter bar assembly 210*a*.

Thus, the cutter bars 202 of the right and left cutter bar assemblies 210*a*, 210*b* are configured to oscillate in opposing directions and in a direction along a single plane. Consequently, at one extreme in the motion, the knife assemblies 212 of the right and left cutter bar assemblies 210*a*, 210*b* are at a minimum spaced apart distance from one another and at the opposite extreme the knife assemblies 212 of the right and left cutter bar assemblies 210*a*, 210*b* are at a maximum spaced apart distance from one another for purposes of vibration cancellation. The knife assemblies 212 are preferably reciprocatingly driven in timed relation so as to move in opposite sideward directions, such that forces generated by the moving masses of the knife assemblies 212 are at least substantially contained within the structure of the invention, thereby substantially reducing or eliminating transfer of vibrations to the structure of sickle header 104, and, from there to the combine harvester 102. Additionally, as the two epicyclic drives 308, 310 in the right cutter bar assembly 210*a* rotate in the opposite direction while connected to the transfer plate 224 to move the knife assembly 212 in its linear oscillating motion, the opposite rotational movements of the two epicyclic drives 308, 310 cancel fore-to-aft vibrations. Similar for-to-aft vibration cancelling is provided in the left cutter bar assembly 210*b* by the two oppositely rotating epicyclic drives 312 and 314. The linear oscillating motion of the knife assemblies 212 is driven by the epicyclic drives 308, 310, 312, 314 without requiring pivoting and reversing components in the epicyclic drives as the drive motion experienced by the associated bearings is in a rotational direction. As is known in the art, vibration causes wear and tear on the various moving components of a cutter bar assemblies. Thus, the present construction is believed to minimize both side-to-side and fore-to-aft vibration, thereby effectively reducing harmful wear and tear.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A sickle header having an elongate cutter bar along a forward edge of the sickle header that extends in a transverse direction along a width of sickle header operable for severing crop, the sickle header having a stationary bar on the forward portion of and extending along the width of the elongate cutter bar with an array of guards projecting forwardly at sidewardly spaced intervals, wherein the sickle header comprises:

a right cutter bar assembly and a left cutter bar assembly, each cutter bar assembly having an elongate knife assembly formed of a plurality of knife sections configured to move in a reciprocating motion to effects a cutting action which severs plant stems captured between the plurality of knife sections and the guards;

a first transfer plate connected to the knife assembly of the right cutter bar assembly and a second transfer plate connected to the knife assembly of the left cutter bar assembly;

a center sickle drive assembly connected in driving relation to the first and second transfer plates, the center sickle drive assembly comprising:

a drive motor gear;

a first epicyclic drive and a second epicyclic drive connected to the right cutter bar assembly, wherein each of the first and second epicyclic drives is configured to translate rotational movement of the drive motor gear into linear oscillating motion of an output crank that is connected to the first transfer plate, such that the cranks of the first and second epicyclic drives simultaneously drive the knife assembly of the right cutter bar assembly in a reciprocating motion;

a third epicyclic drive and a fourth epicyclic drive connected to the left cutter bar assembly wherein each of the third and fourth epicyclic drives is configured to translate rotational movement of the drive motor gear into linear oscillating motion of an output crank that is connected to the second transfer plate, such that the cranks of the third and fourth epicyclic drives simultaneously drive the knife assembly of the left cutter bar assembly in a reciprocating motion;

a first pair of cranks that interact with the transfer plate connected to the right cutter bar assembly such that the pair of cranks are simultaneously operable for reciprocatingly driving a knife assembly of the right cutter bar assembly sidewardly, and a second pair of cranks that interact with the transfer plate connected to the left cutter bar assembly such that the pair of cranks are simultaneously operable for reciprocatingly driving a knife assembly of the left cutter bar assembly sidewardly, the left and right knife assemblies configured in timed relation so that the left and right knife assemblies move in opposite sideward directions.

2. The sickle header of claim 1 wherein the drive motor gear is driven by a drive motor.

3. The sickle header of claim 1 wherein the center sickle drive assembly is positioned at a central location on the sickle header where the right and left cutter bar assemblies meet.

4. The sickle header of claim 1 wherein the drive motor gear meshes with the third epicyclic drive and the third epicyclic drive meshes with the fourth epicyclic drive, and wherein the third and fourth epicyclic drives are configured such that the pair of cranks driven by the third and fourth epicyclic drives are simultaneously driven in the same linear oscillating motion to drive the knife assembly of the left cutter bar assembly.

5. A sickle header having an elongate cutter bar along a forward edge of the sickle header that extends in a transverse direction along a width of sickle header operable for severing crop, the sickle header having a stationary bar on the forward portion of and extending along the width of the elongate cutter bar with an array of guards projecting forwardly at sidewardly spaced intervals, wherein the sickle header comprises:

a right cutter bar assembly and a left cutter bar assembly, each cutter bar assembly having an elongate knife assembly formed of a plurality of knife sections configured to move in a reciprocating motion to effects a cutting action which severs plant stems captured between the plurality of knife sections and the guards;

a first transfer plate connected to the knife assembly of the right cutter bar assembly and a second transfer plate connected to the knife assembly of the left cutter bar assembly;

a center sickle drive assembly connected in driving relation to the first and second transfer plates, the center sickle drive assembly comprising:

a drive motor gear:

a first epicyclic drive and a second epicyclic drive connected to the right cutter bar assembly, wherein each of the first and second epicyclic drives is configured to translate rotational movement of the drive motor gear into linear oscillating motion of an output crank that is connected to the first transfer plate, such that the cranks of the first and second epicyclic drives simultaneously drive the knife assembly of the right cutter bar assembly in a reciprocating motion;

a third epicyclic drive and a fourth epicyclic drive connected to the left cutter bar assembly wherein each of the third and fourth epicyclic drives is configured to translate rotational movement of the drive motor gear into linear oscillating motion of an output crank that is connected to the second transfer plate, such that the cranks of the third and fourth epicyclic drives simultaneously drive the knife assembly of the left cutter bar assembly in a reciprocating motion, wherein of the third epicyclic drive meshes with the second epicyclic drive causing rotation thereof.

6. The sickle header of claim 5 wherein the drive motor gear is driven by a drive motor.

7. The sickle header of claim 5 wherein the center sickle drive assembly is positioned at a central location on the sickle header where the right and left cutter bar assemblies meet.

\* \* \* \* \*